(12) United States Patent
Ciminski et al.

(10) Patent No.: US 8,671,530 B2
(45) Date of Patent: Mar. 18, 2014

(54) QUICK RELEASE CLAMP AND METHOD OF USE

(75) Inventors: John Ciminski, Apache Junction, AZ (US); Verl Edward Miller, LaGrande, OR (US); James Hawthorne, Vancouver, WA (US); Joseph C. Giancaspro, Gilbert, AZ (US); Jeffrey P. Baldwin, Phoenix, AZ (US)

(73) Assignee: MCR Strength, Inc., Vancouver, WA (US)

( * ) Notice: Subject to any disclaimer, the term of this patent is extended or adjusted under 35 U.S.C. 154(b) by 502 days.

(21) Appl. No.: 12/984,899

(22) Filed: Jan. 5, 2011

(65) Prior Publication Data
US 2011/0162173 A1    Jul. 7, 2011

Related U.S. Application Data

(60) Provisional application No. 61/292,717, filed on Jan. 6, 2010.

(51) Int. Cl.
*F16B 2/10* (2006.01)
*A63B 21/06* (2006.01)
*A63B 21/072* (2006.01)

(52) U.S. Cl.
USPC ............... 24/494; 24/273; 24/498; 24/513; 24/517; 482/107

(58) Field of Classification Search
USPC ............. 24/494, 498, 505, 517, 513, 568, 24, 24/25; 269/217, 218, 236, 157, 158, 159; 81/487, 321; 482/107
See application file for complete search history.

(56) References Cited

U.S. PATENT DOCUMENTS

| 111,618 | A | * | 2/1871 | Devlin ............................. 269/5 |
| 2,244,351 | A | | 6/1941 | Venables |
| 3,305,234 | A | | 2/1967 | Cline et al. |
| 4,585,367 | A | | 4/1986 | Gall |
| 4,639,979 | A | | 2/1987 | Polson |
| 4,646,398 | A | | 3/1987 | Myhrman |
| 4,817,944 | A | | 4/1989 | Anderson et al. |
| 5,062,631 | A | | 11/1991 | Dau et al. |
| 5,295,933 | A | | 3/1994 | Ciminski et al. |
| 5,380,338 | A | * | 1/1995 | Christian ...................... 606/130 |
| 5,611,123 | A | * | 3/1997 | Prizzi ............................. 24/459 |
| 6,862,780 | B2 | * | 3/2005 | Henry ............................. 24/536 |
| 7,249,399 | B2 | * | 7/2007 | Taylor ............................ 24/505 |

* cited by examiner

*Primary Examiner* — Robert J Sandy
(74) *Attorney, Agent, or Firm* — Schmeiser, Olsen & Watts LLP; Jordan M. Meschkow; Charlene R. Jacobsen

(57) ABSTRACT

A clamp (20) includes a first barrel half (26) and second barrel half (28). A hinge pin (30) pivotally couples a first edge (38) of the first barrel half (26) with a third edge (46) of the second barrel half (28). A spring (96) imposes force on the barrel halves (26, 28) to bias a second edge (40) of the first barrel half (26) away from a fourth edge (48) of the first barrel half (28) to create a gap (34) between edges (40, 48), placing the clamp (20) in an open position (22). A handle (32) includes a base (80) that abuts an outer surface (54) of the barrel halves (26, 28) to compel the second edge (40) of the first barrel half (26) toward the fourth edge (48) of the first barrel half (28) to close the gap (34), placing the clamp (20) in a closed position (22).

18 Claims, 6 Drawing Sheets

QUICK RELEASE CLAMP AND METHOD OF USE

RELATED INVENTION

The present invention claims priority under 35 U.S.C. §119(e) to: "Quick Release Open Bar Clamp," U.S. Provisional Patent Application Ser. No. 61/292,717, filed 6 Jan. 2010, which is incorporated by reference herein.

TECHNICAL FIELD OF THE INVENTION

The present invention relates generally to clamping devices. More specifically, the present invention relates to a quick release clamp for a generally cylindrical bar or pipe.

BACKGROUND OF THE INVENTION

There are numerous devices which are used as clamps on pipes, bars, shafts and the like. By way of example, devices for retaining weights on a bar used for weightlifting applications are well known. In weightlifting, disk shaped weights are typically mounted, alone or in combination, on a bar by inserting the bar through a hole in the center of each disk. The combination of the bar and weights is typically referred to as a barbell. For weightlifting it is important that the disk shaped weights are securely held onto the bar. Indeed, considerable damage and/or personal injury could occur if a weight disk slides off of or otherwise detaches from the bar when the barbell is in use.

The weight disks can be prevented from sliding off the bar by a clamp structure which is placed on the bar between the outermost weight disk and the end of the bar. Such a clamp structure must adequately secure to the bar to be effective. In addition, a clamp structure should be easy to install and remove since the clamp may be removed frequently so that the weight configuration can be changed. This can occur because an exercise program requires different weights, or more than one person is using the barbell and each requires different weights.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

Embodiments of the invention entail a quick release clamp for a generally cylindrical elongated structure, such as a bar, pipe, or shaft, and a method of using the quick release clamp. The clamp can be readily installed on a bar and may be closed using a quarter turn locking mechanism so that the clamp is securely mounted to the bar.

Figure 1:
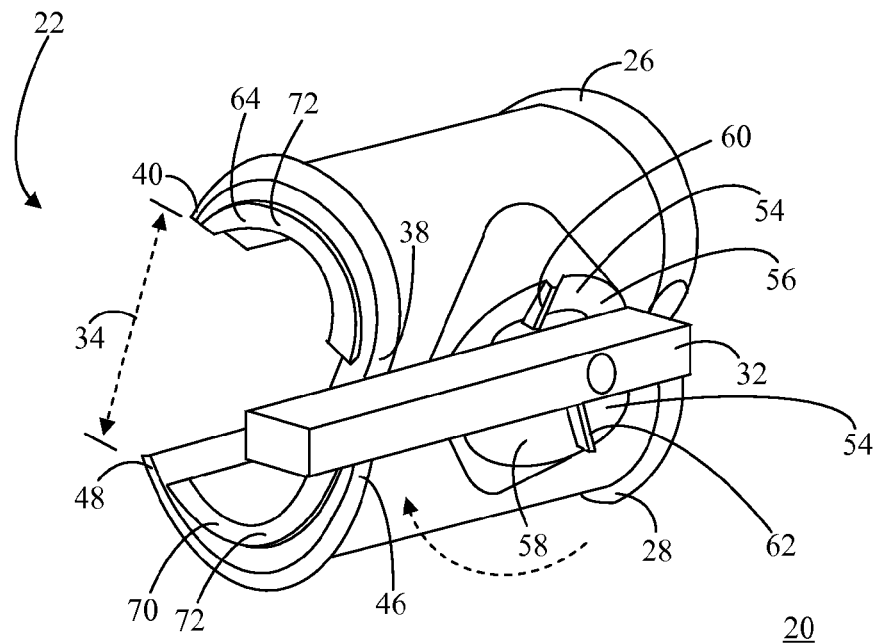
FIG. 1 shows a perspective view of a quick release clamp in accordance with an embodiment.
Figure 2:
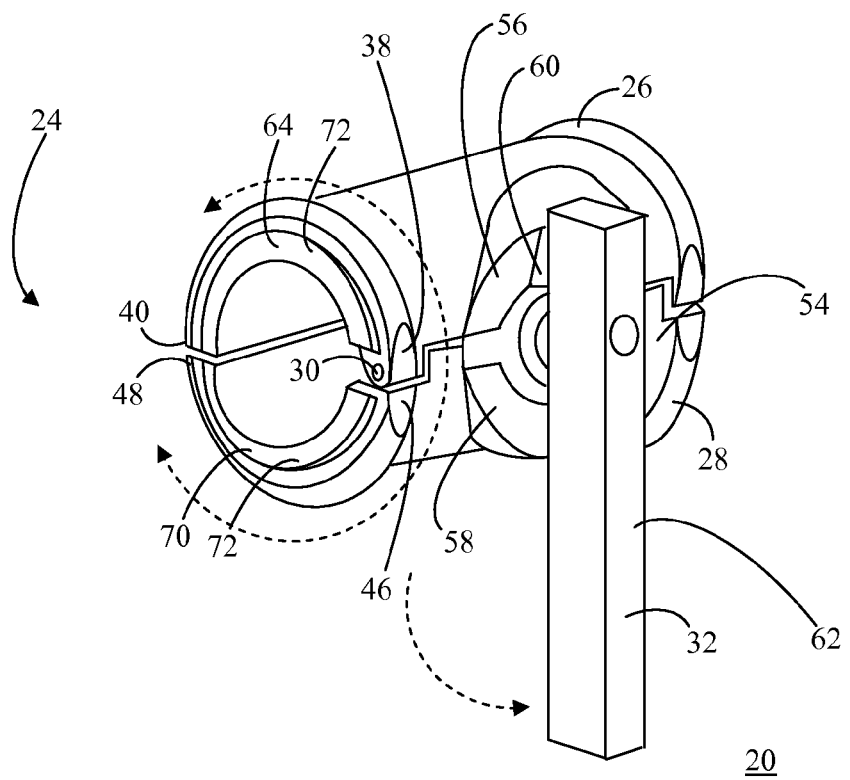
FIG. 2 shows a perspective view of the quick release clamp of FIG. 1 in a closed position.

Referring to FIGS. 1 and 2, FIG. 1 shows a perspective view of a quick release clamp 20 in an open position 22 in accordance with an embodiment, and FIG. 2 shows a perspective view of quick release clamp 20 in a closed position 24. Clamp 20 generally includes a first barrel half 26, a second barrel half 28, a hinge pin 30 (visible in FIG. 2) pivotally coupling the first and second barrel halves 26 and 28, respectively, and a handle 32. Clamp 20 is actuated by turning handle 32 approximately a quarter turn so that first and second barrel halves 26 and 28, respectively, separate to provide a gap 34 through which a generally cylindrical bar 36 (see FIG. 6) may be inserted. Once clamp 20 is mounted over bar 36 (FIG. 6), handle 32 can be rotated another quarter turn to place clamp 20 in closed position 24.

Figure 3:
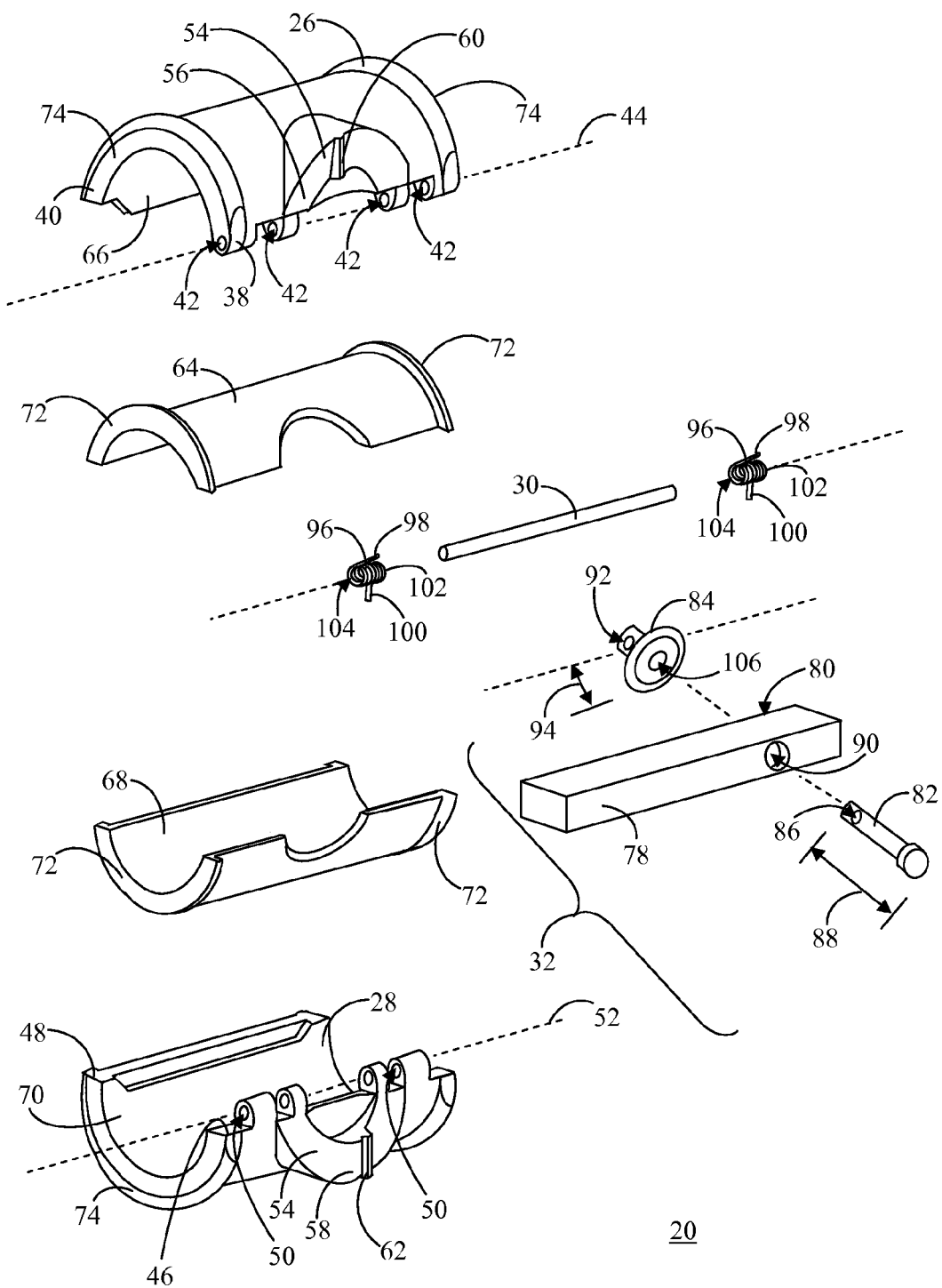
FIG. 3 shows an exploded perspective view of the clamp.

With reference to FIG. 3 in connection with FIGS. 1-2, FIG. 3 shows an exploded perspective view of clamp 20. First barrel half 26 has longitudinal edges, referred to herein as a first edge 38 and a second edge 40. Passages 42 are formed at first edge 38 and are aligned with a longitudinal dimension 44 of first barrel half 26. Likewise, second barrel half 28 has longitudinal edges, referred to herein as a third edge 46 and a fourth edge 48. Passages 50 are formed at third edge 46 and are aligned with a longitudinal dimension 52 of second barrel half 28. Although each of first and second barrel halves 26 and 28, respectively, as shown as having four passages 42 and 50 each, it should be understood that in alternative embodiments, the quantity of passages along first and third edges 38 and 46 may be less than or greater than that which is shown.

The terms "first," "second," "third," "fourth," and so forth used herein do not refer to an ordering or prioritization of elements within a countable series of elements. Rather, the terms "first," "second," "third," and "fourth" are used to distinguish the particular elements for clarity of discussion.

In an embodiment, each of first and second barrel halves 26 and 28 includes an outer contact surface 54. More specifically, outer contact surface 54 of first barrel half 26 includes a first planar face 56 extending above and arranged approximately tangential to the curvature of first barrel half 26. Likewise, outer contact surface 54 of second barrel half 28 includes a second planar face 58 extending above and arranged approximately tangential to the curvature of second barrel half 28. Outer contact surface 54 of at least one of first and second barrel halves 26 and 28 further includes at least one stop. In this exemplary embodiment, first planar face 56 includes a first stop 60 and second planar face 58 includes a second stop 62. Each of stops 60 and 62 extends above respective first and second planar faces 56 and 58. The function of planar faces 56 and 58, having stops 60 and 62 will be discussed in greater detail below.

Figure 6:
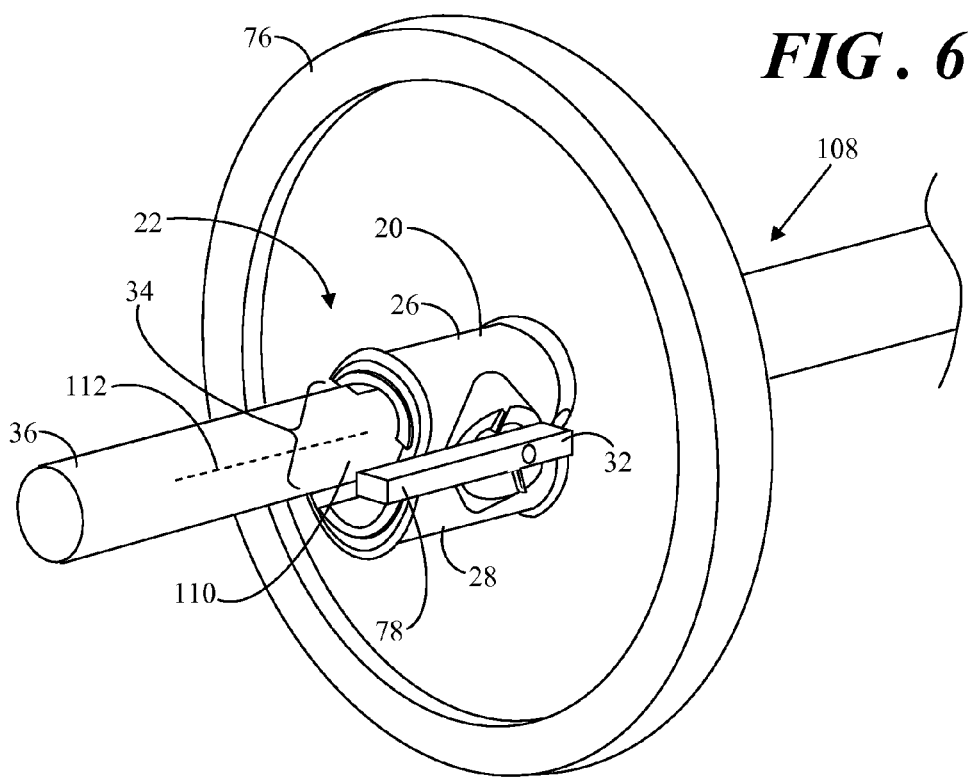
FIG. 6 shows a perspective view of the clamp being mounted onto a barbell.

Clamp 20 may further include a slip resistant liner. In this configuration, the slip resistant liner includes a first liner 64 coupled to a first inner surface 66 of first barrel half 26 and a second liner 68 coupled to a second inner surface 70 of second barrel half 28. First and second liners 64 and 68 may be pre-formed liner material made of rubber or similar material that is adhered to or otherwise coupled to respective first and second inner surfaces 66 and 70. Liners 64 and 68 provide slip resistance so that clamp 20 is less likely to slide along bar 36 (FIG. 6). Additionally, each of liners 64 and 68 may include a pre-formed lip region 72 that covers outer end portions 74 of first and second barrel halves 26 and 28 so as to provide cushioning between clamp 20 and an adjacent weight 76 (see FIG. 6) mounted on bar 36 (FIG. 6). Those skilled in the art will recognize that a slip resistant liner for clamp 20 can be manufactured from a variety of materials and can come in various shapes.

As shown in FIG. 3, handle 32 includes a grip 78, a base 80 formed with grip 78, an extension portion 82, and a shield element 84. Grip 78 having base 80 may be formed as a single unit from metal, plastic, or any other suitably rigid material. Extension portion 82 includes an opening 86 extending through and arranged substantially perpendicular to a longitudinal dimension 88 of extension portion 82. Likewise, grip 78 includes a corresponding opening 90 extending through grip 78, and shield element 84 includes another opening 92 extending through and arranged substantially perpendicular to a longitudinal dimension 94 of shield element 84.

Clamp 20 further includes at least one spring element. In this embodiment, clamp 20 includes two spring elements 96 that couple with hinge pin 30 (discussed below). In an embodiment, each of spring elements 96 is a coiled torsion spring having a first end 98, a second end 100, and a coiled intermediate portion 102 with a central passage 104. In general, a torsion spring derives its usefulness by trying to return to its original shape when subject to a load traveling around its axis. Hence the ends of a torsion spring are attached to other things, and when those things rotate around the center of the spring, the spring tries to push them back to their original position.

Clamp 20 can assembled by directing extension portion 82 through opening 90 in grip 78. A head of extension portion 82 can seat in a recession created in grip 78. Extension portion 82 is subsequently directed through a longitudinal passage 106 in shield element 84 so that opening 86 in extension portion 82 aligns with opening 92 in shield element 84. Assembly of clamp 20 is continued by positioning first and second barrel halves 26 and 28 together in a clamshell position with first edge 38 of first barrel half 26 in proximity with third edge 46 of second barrel half 28, and second edge 40 of first barrel half 26 in proximity with fourth edge 48 of second barrel half 28. Such an arrangement results in the alignment of passages 42 in first barrel half 26 with passages 50 in second barrel half 28.

Next, hinge pin 30 can be directed through aligned passages 42 and 50 on one side of first and second barrel halves 26 and 28, through central passage 104 of one of spring elements 96, through opening 86 in extension portion 82, through central passage 104 of the other spring element 96, and finally through the remaining passages 42 and 50 on the other side of first and second barrel halves 26 and 28. First liner 64 may subsequently be coupled to first inner surface 66 of first barrel half 26 and second liner 68 may subsequently be coupled to second inner surface 70 of second barrel half 28. Of course, in alternative embodiments, first and second liners 64 and 68 may be coupled with corresponding first and second barrel halves 26 and 28 prior to coupling the various other elements via hinge pin 30.

In its assembled configuration, hinge pin 30 pivotally couples first edge 38 of first barrel half 26 with third edge 46 of second barrel half 28. First end 98 of each spring element 96 is in contact with first inner surface 66 proximate first edge 38 of first barrel half 26. Likewise, second end 100 of each spring element 96 is in contact with second inner surface 70 proximate third edge 46 of second barrel half 28.

Figure 4:
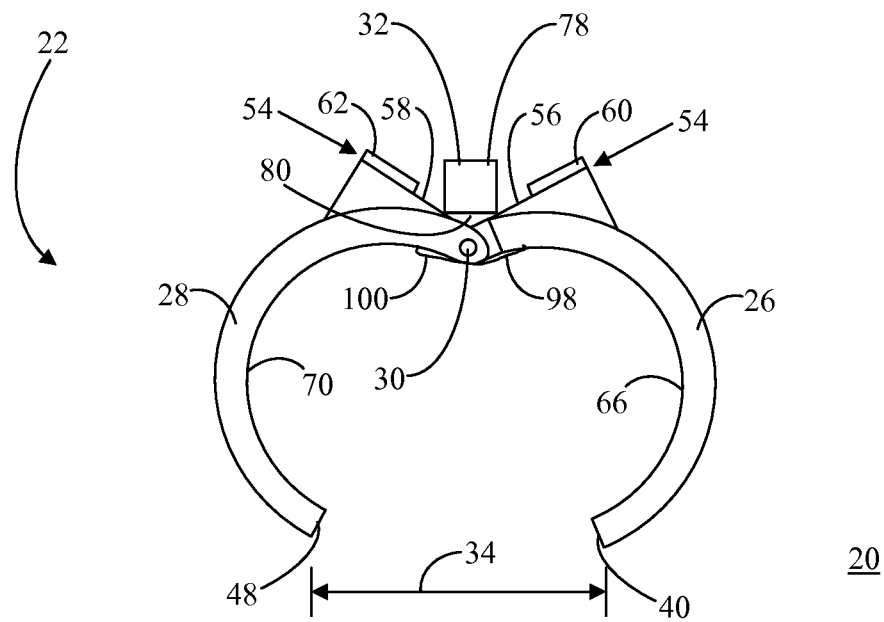
FIG. 4 shows an end view of the clamp in the open position.

FIG. 4 shows an end view of clamp 20 in open position 22. The torsion spring elements 96 (FIG. 3) coupled to hinge pin 30 impose force on first and second barrel halves 26 and 28 via respective first and second ends 98 and 100 to bias second edge 40 of first barrel half 26 away from fourth edge 48 of second barrel half 28. However, pivotal movement of first and second barrel halves 26 and 28 about hinge pin 30 only occurs when grip 78 of handle 32 is turned a one quarter turn so that base 80 of grip 78 cannot come into contact with outer contact surface 54 of each of first and second barrel halves 26 and 28. When handle 32 is positioned as shown in FIG. 4, first and second barrel halves 26 and 28 pivot about hinge pin 30 in opposite directions so that second edge 40 and fourth edge 48 separate to form gap 34.

Figure 5:
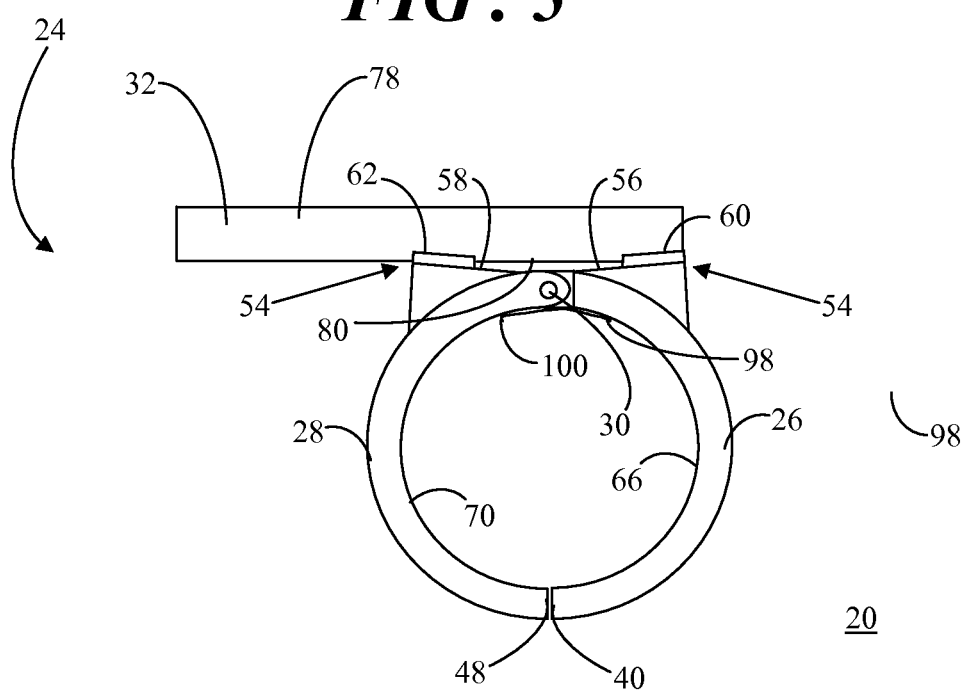
FIG. 5 shows an end view of the clamp in the closed position.

FIG. 5 shows an end view of clamp 20 in closed position 24. Grip 78 of handle 32 has been rotated one quarter turn so that base 80 abuts outer contact surface 54 of each of first and second barrel halves 26 and 28. More particularly, base 80 serves as an elongated portion of grip 78 that abuts both first planar face 56 of first barrel half 26 and second planar face 58 of second barrel half 28. The abutment of base 80 against first and second planar faces 56 and 58 compels second edge 40 of first barrel half 26 toward fourth edge 48 of second barrel half 28 in opposition to the force imposed by spring elements 96. Accordingly, first and second barrel halves 26 and 28 pivot about hinge pin 30 toward one another so that second edge 40 and fourth edge 48 move together to close gap 34 (FIG. 4).

It should be observed that as grip 78 rotates to move clamp 20 into closed position 24, base 80 will contact and slide over stops 60 and 62. Stops 60 and 62 function to impede movement of base 80 of handle 32 when clamp 20 is in closed position 24 with base abutting first and second planar faces 56 and 58.

Figure 7:
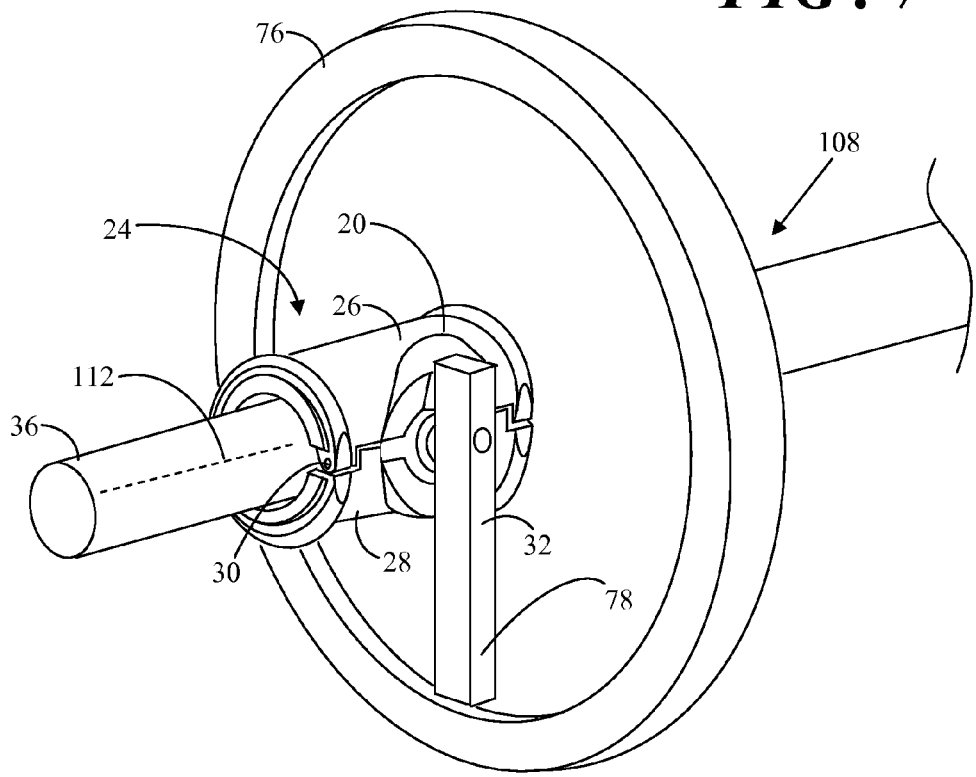
FIG. 7 shows a perspective view of the clamp in the closed position and secured to the barbell.

Referring to FIGS. 6 and 7, FIG. 6 shows a perspective view of clamp 20 being mounted onto a barbell 108 and FIG. 7 shows a perspective view of clamp 20 in closed position 24 and secured to barbell 108. Barbell 108 includes one or more disk shaped weights 76, of which one is shown, mounted on bar 36. The number and size of weights 76 may vary according to individual requirements. Clamp 20 is used to secure weights 76 onto bar 36. It should be readily understood that a second end of bar 36 has a similar configuration of weights 36. A second clamp 20 may be used to secure weights 76 onto the second end of bar 36.

A method of using clamp 20 entails placing at least one of weights 76 on bar 36. Clamp 20 is provided and is oriented in open position to produce gap 34. Clamp 20 is then placed on bar 36 outwardly from weights 76 by passing an intermediate portion 110 of bar 36 through gap 34. Clamp 20 is secured to bar 36 by rotating grip 78 of handle 32 to cause first and second barrel halves 26 and 28 to pivot about hinge pin 30 toward one another so that second edge 40 (FIG. 1) of first barrel half 26 is compelled, or driven, toward fourth edge 48 (FIG. 1) of second barrel half 28 to close gap 34.

When clamp 20 is in closed position 24, first and second barrel halves 26 and 28 are together to form a tubular central passage exhibiting a longitudinal axis 112 in which bar 36 resides. This tubular central passage may have a diameter that is approximately equivalent to or only slightly larger than the diameter of bar 36 so that clamp 20 is tightly secured to bar 36, thus preventing slippage of weights 76 off of bar 36. This same methodology is employed on the other end of bar 36 with a second clamp 20 to secure weights 76 onto the other end of bar 36.

Figure 8:
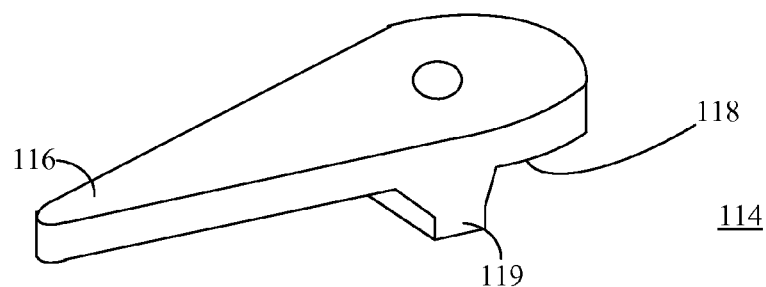
FIG. 8 shows a perspective view of a handle for the clamp in accordance with an alternative embodiment.

FIG. 8 shows a perspective view of a handle 114 in accordance with an alternative embodiment. Handle 114 includes a grip 116 having a base 118. Extension portion 82 (FIG. 3) and shield element 84 (FIG. 3) may be adapted for use with grip 116 so that extension portion 82 couples handle 114 with hinge pin 30 (FIG. 3). Base 118 of handle 114 includes an elongated portion 119 that is oriented approximately perpendicular to grip 116.

Referring briefly to FIGS. 6 and 7, when clamp 20 is in open position 22, grip 78 of handle 32 is substantially aligned with longitudinal axis 112 of clamp 20, and when clamp 20 is in closed position 24, grip 78 of handle 32 is approximately perpendicular to longitudinal axis 112. The alternative embodiment of handle 114 shown in FIG. 8 is provided herein to illustrate a configuration in which the grip may be oriented opposite to grip 78 of handle 32 during operational use.

Figure 9:
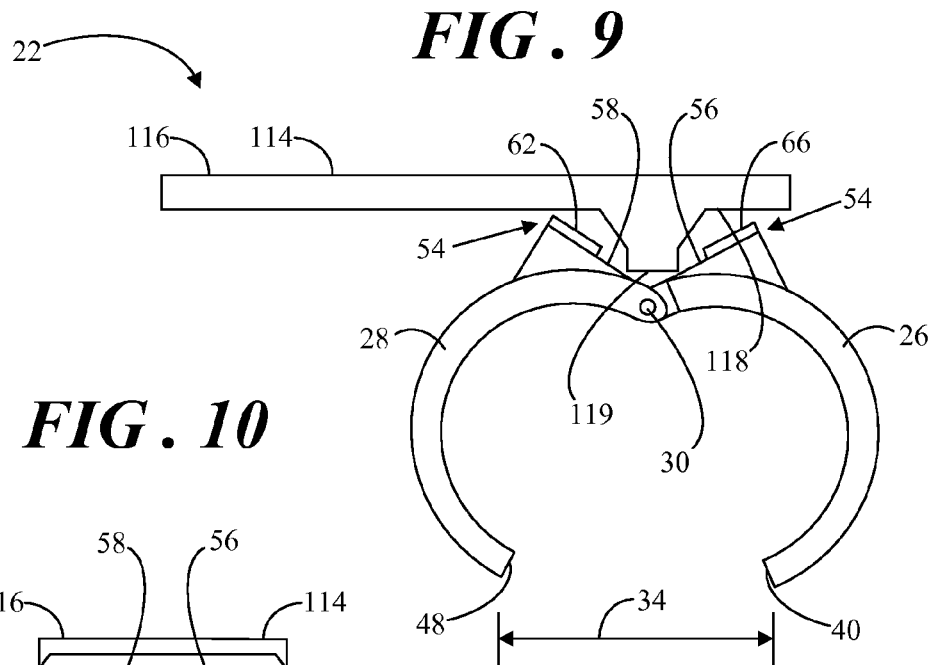
FIG. 9 shows an end view of the clamp having the handle of FIG. 8 and placed in the open position.

FIG. 9 shows an end view of a clamp 120 having handle 114 and placed in open position 22. A description of the components of clamp 20 (FIG. 1) that are also used to form clamp 120 will not be repeated herein for brevity. In the illustrated embodiment of clamp 120, pivotal movement of first and second barrel halves 26 and 28 about pivot pin 30 occurs when grip 116 of handle 114 is turned one quarter turn so that elongated portion 119 of base 118 cannot come into contact with outer contact surface 54 of each of first and second barrel halves 26 and 28. That is, when handle 114 is positioned as shown in FIG. 9, first and second barrel halves 26 and 28 pivot about hinge pin 30 in opposite directions so that second edge 40 and fourth edge 48 separate to form gap 34. Additionally, grip 116 of handle 114 is oriented approximately perpendicular to longitudinal axis 112 (FIG. 7) of clamp 120 (i.e., crosswise to first and second barrel halves 26 and 28) when clamp 120 is in open position 22.

Figure 10:
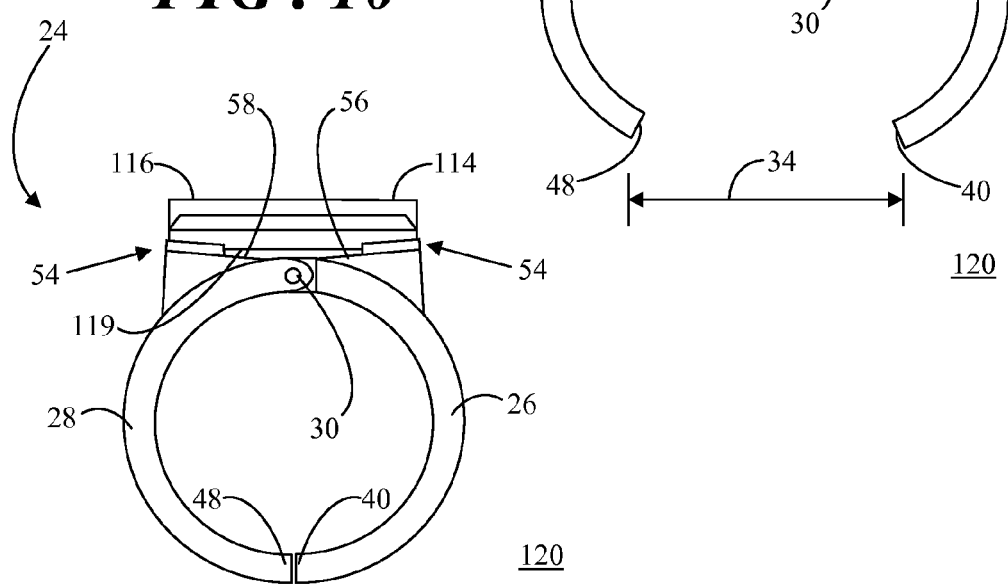
FIG. 10 shows an end view of the clamp of FIG. 9 in the closed position.

FIG. 10 shows an end view of clamp 120 in closed position 24. Grip 116 of handle 114 has been rotated one quarter turn so that elongated portion 119 of base 118 abuts outer contact surface 54 of each of first and second barrel halves 26 and 28. More particularly, elongated portion 119 abuts both first planar face 56 of first barrel half 26 and second planar face 58 of second barrel half 28. The abutment of elongated portion 119 against first and second planar faces 56 and 58 compels second edge 40 of first barrel half 26 toward fourth edge 48 of second barrel half 28 to close gap 34. Additionally, grip 116 of handle 114 is oriented approximately parallel to longitudinal axis 112 (FIG. 7) of clamp 120 (i.e., aligned with first and second barrel halves 26 and 28) when clamp 120 is in closed position 24.

Figure 11:
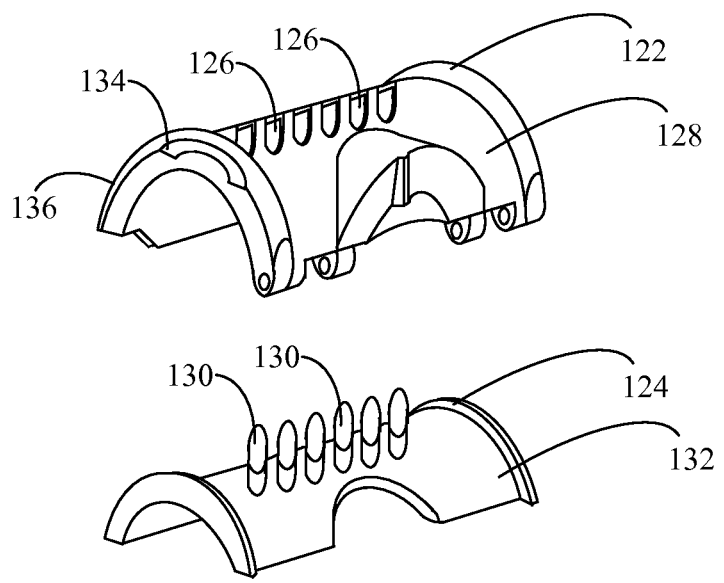
FIG. 11 shows an exploded perspective view of a barrel half and liner for the clamp in accordance with an alternative embodiment.
Figure 12:
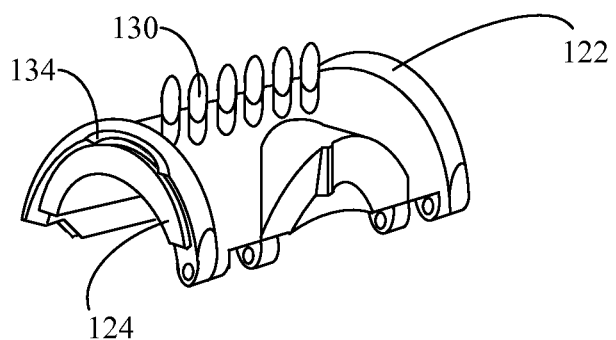
FIG. 12 shows a perspective view of the liner of FIG. 11 installed in the barrel half of FIG. 11.

With reference to FIGS. 11 and 12, FIG. 11 shows an exploded perspective view of a barrel half 122 and liner 124 for clamp 20 in accordance with an alternative embodiment, and FIG. 12 shows a perspective view of liner 124 installed in barrel half 122. Barrel half 122 may be implemented in lieu of first barrel half 26 (FIG. 1) in either of clamps 20 (FIG. 1) and 120 (FIG. 9). In addition, the features of barrel half 122 and liner 124 may also be adapted for use in another barrel half (not shown) that may be implemented in lieu of second barrel half 28 (FIG. 1) in either of clamps 20 and 120.

Barrel half 122 includes at least one aperture 126 (of which six are shown) extending through a sidewall 128 of barrel half 122, and liner 124 includes at least one projection feature 130 (of which six are shown) extending from an outer surface 132 of liner 124. The quantity, shape, and locations of projection features 130 match that of apertures 126. Thus, when liner 124 is installed in barrel half 122, projection features 130 extend through sidewall 128 to provide secure coupling between barrel half 122 and liner 124. Additionally, projection features 130 can provide a better grip for a user of clamp 20 or clamp 120. Although not shown, any of barrel halves 26, 28, and/or 122 may have indentations, irregular surfaces, and so forth that also allow the user to pick up and hold clamp 20 or clamp 120 with greater ease.

A magnet 134 is affixed to an outer surface 136 of barrel half 122. In an embodiment, magnet 134 may be affixed to an end of barrel half 122. Magnet 134 allows clamp 20 or clamp 120 to lock tight against a metallic weight plate (e.g., weight 76 shown in FIG. 6) after the clamp is placed on bar 36 (FIG. 6).

In summary, embodiments entail a quick release clamp for a generally cylindrical elongated structure, such as a bar, pipe, or shaft, and a method of using the quick release clamp. The clamp includes two barrel, or crescent, shaped halves that fit together to form a generally cylindrical tubular passage in which the bar can fit. The barrel shaped halves are pivotally coupled to one another along a mating pair of edges. A spring element imposes force on the two barrel halves to cause the barrel halves to pivot and separate to form a gap between the other pair of edges. The clamp can be slipped onto a bar at any position by placing the bar through the gap, instead of the more conventional technique of sliding a clamp on from the end of the bar. Thus, the clamp can be readily installed on a bar and can be closed using a quarter turn locking mechanism so that the clamp is securely mounted to the bar.

Although the preferred embodiments of the invention have been illustrated and described in detail, it will be readily apparent to those skilled in the art that various modifications may be made therein without departing from the spirit of the invention or from the scope of the appended claims. For example, the clamp can be manufactured in various sizes to accommodate various diameters of bars, the handle may be a knob type handle instead of a lever type handle, and so forth.

What is claimed is:

1. A quick release clamp comprising:
   a first barrel half having a first edge and a second edge;
   a second barrel half having a third edge and a fourth edge;
   a hinge pin pivotally coupling said first edge of said first barrel half with said third edge of said second barrel half;
   a spring element coupled with said hinge pin, said spring element having a first spring end in contact with said first barrel half at said first edge and a second spring end in contact with said second barrel half at said third edge, said spring element imposing force on said first and second barrel halves to bias said second edge of said first barrel half away from said fourth edge of said second barrel half; and
   a handle having an extension portion coupled with said hinge pin and a base for abutting an outer contact surface of each of said first and second barrel halves to compel said second edge of said first barrel half toward said fourth edge of said second barrel half in opposition to said force, wherein said outer contact surface of said each of said first and second barrel halves comprises a planar face arranged approximately tangential to said each of said first and second barrel halves, and said base of said handle is in abutment with said planar face when said clamp is in a closed position.

2. A quick release clamp comprising:
   a first barrel half having a first edge and a second edge;
   a second barrel half having a third edge and a fourth edge;
   a hinge pin pivotally coupling said first edge of said first barrel half with said third edge of said second barrel half;
   a spring element coupled with said hinge pin, said spring element having a first spring end in contact with said first barrel half at said first edge and a second spring end in contact with said second barrel half at said third edge, said spring element imposing force on said first and second barrel halves to bias said second edge of said first barrel half away from said fourth edge of said second barrel half; and a handle having an extension portion coupled with said hinge pin and a base for abutting an outer contact surface of each of said first and second barrel halves to compel said second edge of said first barrel half toward said fourth edge of said second barrel half in opposition to said force, wherein said base of said handle includes an elongated portion oriented approximately perpendicular to a longitudinal axis of said first and second barrel halves and in abutment with said outer contact surface of said each of said first and second barrel halves when said clamp is in a closed position.

3. A quick release clamp as claimed in claim 2 wherein said handle includes a grip formed with said base and oriented approximately perpendicular to said elongated portion, said grip is aligned with said longitudinal axis of said first and second barrel halves when said clamp is in said closed position, and said grip is approximately perpendicular to said longitudinal axis when said clamp is in an open position.

4. A quick release clamp comprising:
a first barrel half having a first edge and a second edge;
a second barrel half having a third edge and a fourth edge;
a hinge pin pivotally coupling said first edge of said first barrel half with said third edge of said second barrel half;
a spring element coupled with said hinge pin, said spring element having a first spring end in contact with said first barrel half at said first edge and a second spring end in contact with said second barrel half at said third edge, said spring element imposing force on said first and second barrel halves to bias said second edge of said first barrel half away from said fourth edge of said second barrel half; and
a handle having an extension portion coupled with said hinge pin and a base for abutting an outer contact surface of each of said first and second barrel halves to compel said second edge of said first barrel half toward said fourth edge of said second barrel half in opposition to said force, wherein said outer contact surface of at least one of said each of said first and second barrel halves comprises a stop extending from said outer contact surface to impede movement of said base of said handle when said clamp is in a closed position with said base abutting said outer contact surface.

5. A quick release clamp comprising:
a first barrel half having a first edge and a second edge, said first barrel half including a first passage formed at said first edge and aligned with a longitudinal dimension of said first barrel half;
a second barrel half having a third edge and a fourth edge, said second barrel half including a second passage formed at said third edge and aligned with a longitudinal dimension of said second barrel half;
a hinge pin pivotally coupling said first edge of said first barrel half with said third edge of said second barrel half, said hinge pin being directed through each of said first and second passages;
a spring element coupled with said hinge pin, said spring element having a first spring end in contact with said first barrel half at said first edge and a second spring end in contact with said second barrel half at said third edge, said spring element imposing force on said first and second barrel halves to bias said second edge of said first barrel half away from said fourth edge of said second barrel half; and a handle having an extension portion coupled with said hinge pin and a base for abutting an outer contact surface of each of said first and second barrel halves to compel said second edge of said first barrel half toward said fourth edge of said second barrel half in opposition to said force.

6. A quick release clamp comprising:
a first barrel half having a first edge and a second edge;
a second barrel half having a third edge and a fourth edge;
a hinge pin pivotally coupling said first edge of said first barrel half with said third edge of said second barrel half;
a spring element coupled with said hinge pin, wherein said spring element is a coiled torsion spring, and said hinge pin is directed through a central passage of said coiled torsion spring, said spring element having a first spring end in contact with said first barrel half at said first edge and a second spring end in contact with said second barrel half at said third edge, said spring element imposing force on said first and second barrel halves to bias said second edge of said first barrel half away from said fourth edge of said second barrel half; and
a handle having an extension portion coupled with said hinge pin and a base for abutting an outer contact surface of each of said first and second barrel halves to compel said second edge of said first barrel half toward said fourth edge of said second barrel half in opposition to said force.

7. A quick release clamp as claimed in claim 6 wherein:
said first spring end of said coiled torsion spring is in contact with a first inner surface of said first barrel half at said first edge; and
said second spring end of said coiled torsion spring is in contact with a second inner surface of said second barrel half at said third edge.

8. A quick release clamp comprising:
a first barrel half having a first edge and a second edge;
a second barrel half having a third edge and a fourth edge;
a hinge pin pivotally coupling said first edge of said first barrel half with said third edge of said second barrel half;
a spring element coupled with said hinge pin, said spring element having a first spring end in contact with said first barrel half at said first edge and a second spring end in contact with said second barrel half at said third edge, said spring element imposing force on said first and second barrel halves to bias said second edge of said first barrel half away from said fourth edge of said second barrel half; and
a handle having an extension portion coupled with said hinge pin and a base for abutting an outer contact surface of each of said first and second barrel halves to compel said second edge of said first barrel half toward said fourth edge of said second barrel half in opposition to said force, wherein said extension portion of said handle includes an opening extending through said extension portion arranged substantially perpendicular to a longitudinal dimension of said extension portion, and said hinge pin is directed through said opening to couple said handle with said hinge pin.

9. A quick release clamp comprising:
a first barrel half having a first edge and a second edge;
a second barrel half having a third edge and a fourth edge;
a slip resistant liner coupled to an inner surface of at least one of said first and second barrel halves;
a hinge pin pivotally coupling said first edge of said first barrel half with said third edge of said second barrel half;
a spring element coupled with said hinge pin, said spring element having a first spring end in contact with said first barrel half at said first edge and a second spring end in contact with said second barrel half at said third edge, said spring element imposing force on said first and second barrel halves to bias said second edge of said first barrel half away from said fourth edge of said second barrel half; and a handle having an extension portion coupled with said hinge pin and a base for abutting an outer contact surface of each of said first and second barrel halves to compel said second edge of said first barrel half toward said fourth edge of said second barrel half in opposition to said force.

10. A quick release clamp as claimed in claim 9 wherein said at least one of said first and second barrel halves includes an aperture extending through a sidewall, and said slip resistant liner includes a projection feature projecting into said aperture.

11. A quick release clamp comprising:
a first barrel half having a first edge and a second edge;
a second barrel half having a third edge and a fourth edge;
a hinge pin pivotally coupling said first edge of said first barrel half with said third edge of said second barrel half;
a spring element coupled with said hinge pin, said spring element having a first spring end in contact with said first barrel half at said first edge and a second spring end in contact with said second barrel half at said third edge, said spring element imposing force on said first and second barrel halves to bias said second edge of said first barrel half away from said fourth edge of said second barrel half;
a handle having an extension portion coupled with said hinge pin and a base for abutting an outer contact surface of each of said first and second barrel halves to compel said second edge of said first barrel half toward said fourth edge of said second barrel half in opposition to said force; and
a magnet coupled to an outer surface of at least one of said first and second barrel halves.

12. A quick release clamp comprising:
a first barrel half having a first edge, a second edge, and a first passage formed at said first edge and aligned with a longitudinal dimension of said first barrel half;
a second barrel half having a third edge, a fourth edge, and a second passage formed at said third edge and with a longitudinal dimension of said second barrel half;
a hinge pin directed through said first and second passages to pivotally couple said first edge of said first barrel half to said third edge of said second barrel half;
a spring element coupled with said hinge pin, said spring element having a first spring end in contact with said first barrel half at said first edge and a second spring end in contact with said second barrel half at said third edge, said spring element imposing force on said first and second barrel halves to bias said second edge of said first barrel half away from said fourth edge of said second barrel half; and a handle having an extension portion and a base, said extension portion including an opening extending through said extension portion arranged substantially perpendicular to a longitudinal dimension of said extension portion, said hinge pin being further directed through said opening to couple said handle with said hinge pin, and said base being configured for abutment with an outer contact surface of each of said first and second barrel halves to compel said second edge of said first barrel half toward said fourth edge of said second barrel half in opposition to said force.

13. A quick release clamp as claimed in claim 12 wherein said outer contact surface of said each of said first and second barrel halves comprises a planar face arranged approximately tangential to said each of said first and second barrel halves, and said base of said handle is in abutment with said planar face when said clamp is in a closed position.

14. A quick release clamp as claimed in claim 13 wherein said base of said handle includes an elongated portion oriented approximately perpendicular to a longitudinal axis of said first and second barrel halves and in abutment with said planar face of said each of said first and second barrel halves when said clamp is in said closed position.

15. A quick release clamp as claimed in claim 12 wherein said handle includes a grip formed with said base, said grip is aligned with said longitudinal axis of said first and second barrel halves when said clamp is in a closed position, and said grip is substantially perpendicular to said longitudinal axis when said clamp is in an open position.

16. A quick release clamp as claimed in claim 12 wherein said outer contact surface of at least one of said each of said first and second barrel halves comprises a stop extending from said outer contact surface to impede movement of said base of said handle when said clamp is in a closed position with said base abutting said outer contact surface.

17. A quick release clamp as claimed in claim 12 wherein said spring element is a coiled torsion spring, and said hinge pin is further directed through a central passage of said coiled torsion spring.

18. A quick release clamp as claimed in claim 12 wherein:
said at least one of said first and second barrel halves includes an aperture extending through a sidewall; and
said clamp further comprises a slip resistant liner coupled to an inner surface of at least one of said first and second barrel halves, said slip resistant liner including a projection feature projecting into said aperture.

* * * * *